July 16, 1957      J. M. GRAHAM      2,799,756
PRECISION POTENTIOMETER
Filed July 29, 1953
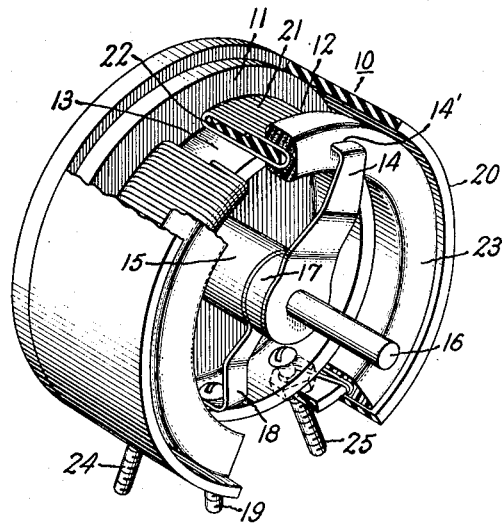
Fig. 1.
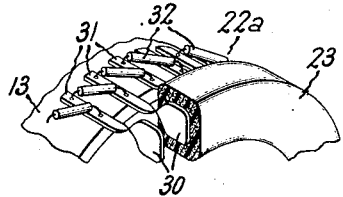
Fig. 3.
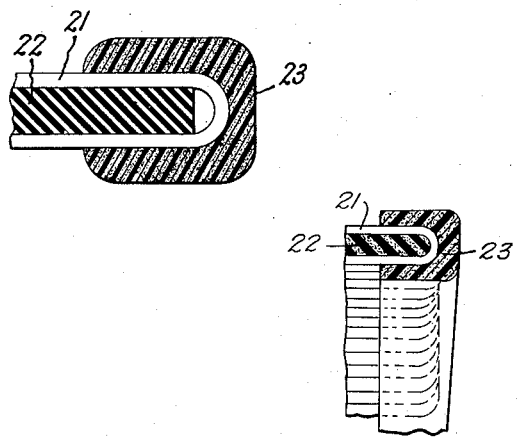
Fig. 2.
Fig. 4
Inventor:
John M. Graham,
by Paul A. Frank
His Attorney.

United States Patent Office 2,799,756
Patented July 16, 1957

2,799,756
PRECISION POTENTIOMETER

John M. Graham, Schenectady, N. Y., assignor to General Electric Company, a corporation of New York Application July 29, 1953, Serial No. 371,094

10 Claims. (Cl. 201—48)

My invention relates to adjustable impedance devices and more particularly to adjustable voltage-dividing devices, commonly called "potentiometers," which provide an output voltage whose magnitude indicates the position of a movable contact member of the device.

Precision potentiometers commonly include closely wound coils of uniform resistivity metal wire as their voltage-dividing resistance elements. A movable contact member is ordinarily arranged to make slideable contact with each succeeding turn in the coil over its range of movement. When a voltage is supplied across the ends of the coil, the voltage subsisting at the contact member represents the position of the member along the coil. Such wire-wound potentiometers provide an output voltage which accurately represents the position of the contact member so long as the member is centrally aligned in contact with a single turn, but the output voltage at the contact member advances in discrete increments as the contact member passes from one turn to an adjacent turn of the coil. Consequently, the output voltage does not accurately represent the position of the contact member during this transition from one turn to the next. If the diameter of the wire in the coil is made very small in order to minimize such transitory inaccuracies, the resulting potentiometer is quite fragile and the wire coil becomes quickly worn through by the friction of the contact member upon the coil especially if the potentiometer is to be used in applications where the contact member is subjected to repeated or continuous excursionary movement.

If larger diameter wire is used for the coil, the transitory inaccuracies are aggravated so that filtering or integrating circuits are often required to compensate for such inaccuracies as well as to prevent any possible discontinuities in the output voltage characteristics as the contact member passes from one turn to the next. Moreover, since the contact member as well as the wire coil are usually made of metal and the contact surfaces between the contact member and the coil are quite rough, considerable sliding friction is generated between these members producing a high level of electrical noise in the output voltage signal.

Potentiometers which employ a unitary, smooth-surfaced resistance element have heretofore not usually been found to have as accurate linearity of output voltage versus contact member position characteristic as the wire-wound type of potentiometer described above. This has generally been due to non-uniform response in such unitary structures to changes in temperature or humidity of the surrounding atmosphere as well as to inherent non-uniformity in the resistivity of the smooth-surfaced resistance materials presently available.

Accordingly, one object of the invention is to provide a potentiometer whose magnitude of output voltage represents the position of its movable contact member with extreme accuracy and linearity throughout its range of movement.

Another object of the invention is to provide a potentiometer which retains the precision of wire-wound potentiometers at discrete positions of the movable contact member, and yet provides a smooth and linear change in output voltage between these discrete positions.

A further object of the invention is to provide a potentiometer having the accuracy of conventional wire-wound potentiometers and yet having smooth-surfaced, low-friction contact between the resistance element and the movable contact member of the potentiometer thereby greatly reducing the wear, and considerably lengthening the life of the potentiometer, as well as eliminating the need for filtering or integrating circuits to smooth out fluctuations away from a linear output voltage change of the potentiometer as the contact member is moved.

Still further objects of the invention are to provide a simple, rugged potentiometer in which the contact member may be moved with great rapidity and continuously throughout its range of movement with a minimum of friction-induced fluctuations or "electrical noise" in its output voltage characteristics.

In general, the precision potentiometer in accordance with the invention comprises an electrically conducting plastic body, a movable contact member continuously engaging the surface of the plastic body along a predetermined path of movable contact therewith, and a plurality of interconnected electrical conductors embedded in mutually closely spaced positions within the plastic body along and closely spaced from the contact path of the contact member. The interconnected embedded conductors may be separate conducting plates connected together by separate resistors, but preferably comprise a coil of closely wound resistance wire. The plastic body which covers and contacts the turns of the embedded coil functions as a plurality of resistive elements connected between adjacent turns of the coil and provides a linear interpolation between the output voltages ordinarily subsisting when the movable contact member overlies the individual turns of the coil. The conducting plastic body is preferably of uniform thickness along the contact path of the movable member and has a resistance over the distance between adjacent turns of the coil substantially greater, for example, from five to twenty times greater than the adjacent turn resistance of the coil itself. Since the conducting plastic is of much higher resistivity than the wire coil, small changes in the resistivity of the plastic resulting for example from wear or from changes in humidity or temperature have minimized effect upon the over-all resistance of the potentiometer or upon its general linearity in the region between any pair of adjacent turns.

The novel features which are believed characteristic of the invention are set forth in the appended claims. The invention itself, however, together with further objects and advantages thereof may best be understood by referring to the following description taken in connection with the accompanying drawing in which Fig. 1 is a perspective view partly in section of a potentiometer in accord with the invention, Fig. 2 is an enlarged cross-sectional view of a portion of the resistance element included in the potentiometer of Fig. 1, Fig. 3 is a perspective view partly in section of another resistance element which may alternatively be employed in a potentiometer made in accord with the invention, and Fig. 4 is a partially broken-away, enlarged, cross-sectional view of a portion of the resistance element included in the potentiometer of Fig. 1 illustrating a conducting plastic body 23 of non-uniform thickness covering the turns of the coil 21.

Referring to Fig. 1, the invention is shown in one form as comprising a circular potentiometer 10 having an insulating supporting base 11, an annular resistance element 12 mounted on a circular upstanding support flange 13 of this supporting base, and a movable contact member 14 in contact with the surface of the resistive element 12 and radially extending from a central supporting rod 15 upon which contact member 14 is rotatably mounted. An axially extending shaft 16 is secured to the mounting of contact member 14 to permit the manual or mechanical rotational adjustment of the angular position of contact member 14. Contact member 14 is journalled on a metal bearing 17 which makes good electrically conducting contact to a stationary metal clip 18 extending between bearing 17 and an output terminal 19 of potentiometer 10. Contact member 14 is preferably composed of an electrically connducting slightly resilient metal such as a thin sheet of spring steel and makes contact with the surface of resistive element 12 under slight tension in order to insure good electrically conductive contact therewith. The contacting edge 14' of contact member 14 is preferably rounded or tapered so as to make substantial punctiform contact with the surface of plastic body 23. A cylindrical housing 20 surrounds the resistive element 12 of potentiometer 10 in spaced relation therewith.

In accord with the invention, the resistive element 12 may comprise a coil 21 of wire wound on a suitable insulating flattened annular coil form 22 and a smooth-surfaced conducting plastic body 23 covering and intimately contacting adjacent turns of coil 21. Preferably, plastic body 23 covers and is securely bonded to a narrowed edge of coil 21 as illustrated. Contact member 14 makes slidable contact with the surface of the conducting plastic body 23 rather than with the turns of coil 21 as in conventional potentiometers. Coil 21 is connected at its ends to respective input terminals 24 and 25 also carried by circular supporting flange 13. Coil terminals 24 and 25 also serve securely to position resistive element 12 upon the circular supporting flange 13.

Coil 21 is made of uniform-resistivity closely-wound turns of moderate diameter wire, for example, conventional Nichrome wire having a diameter, for mechanical strength, preferably greater than 0.001 inch, for example, about 0.005 inch. Coil form 22 may conveniently comprise an insulating ceramic, plastic, or cardboard.

Conducting plastic body 23 is preferably fused to and with the edge of coil 21 by being molded thereto by means of suitable heat and pressure. This conducting plastic 23 may comprise one of the presently available resinous or rubbery binders containing finely divided conducting material as a filler. Among such binders may be mentioned for instance vinyl polymers, polyethylene, phenol-formaldehyde resins, silicone resins as well as various rubbers including synthetic rubbers such as, e. g. butadiene-styrene copolymers, butadiene-acrylonitrile copolymers, silicone rubbers, etc. Among the conducting fillers which may be employed are, for instance, carbon, silicon carbide, and various powdered metals such as powdered copper, powdered iron or conducting metallic oxides. A resin should, of course, be used which tends to wet and fuse with the resistance wire employed for coil 21.

The resistivity per unit distance of such conducting plastic is normally much higher than that of the resistance wire comprising coil 21. For purposes of the invention, it has been found that the resistivity of the conducting plastics over the distance between adjacent turns of the coil should be somewhat greater than the adjacent turn resistance of the coil itself in order to minimize inaccuracies introduced by non-uniformity of the conducting plastics but should not be so great that the voltage drop through the plastic body from the contact member 14 to an embedded turn of coil 21 is greater than the voltage drop between adjacent turns of the coil. For most applications, it has been found that the conducting plastic should have a resistance over the distance between adjacent turns of the coil from five to twenty times greater than the adjacent turn resistance of the coil itself. Because of the fairly high resistivity of most available conducting plastics this means that only a fairly thin layer of conducting plastic, generally of the same order of thickness as the diameter of the wire of coil 21, for example, about 0.004 inch, need be employed between the movable contact member 14 and the embedded wire of coil 21.

Although it is usually preferable to employ a conducting plastic coating 23 having uniform thickness along the contact path of movable member 14, it has been found that for extreme accuracy and precision it is possible to change the contour of the surface of the conducting plastic body 23 either along the contact path of member 14 or along the side walls of body 23 by such means as grinding or scraping so as to vary its thickness and thus alter its longitudinal resistivity along the coil thereby to compensate for any slight changes in the resistivity of either the conducting plastic 23 or the coil 21 along this contact path. This contouring of the contacting surface of the conducting plastic may also be used in order to make a fine adjustment of the total resistance of potentiometer 10. Figure 4 illustrates a conducting plastic coating 23 having such a non-uniform thickness. The non-uniformity illustrated in this figure is exaggerated for purposes of illustration.

Referring now to Fig. 3, there is shown another resistance element 22a suitable for use in potentiometer 10 of Fig. 1 in accord with the invention. In resistance element 22a a plurality of fairly thin metal plates 30 are embedded at uniformly spaced positions along the length and within conducting plastic body 23. Plates 30 have elongated portions 31 extending external to plastic body 23 on one side thereof which portions are secured by such means as rivets to insulating circular supporting flange 13. A plurality of resistors 32, preferably of identical resistance, are connected between the external portions 31 of adjacent plates 30, as illustrated. Resistance wires such as Nichrome can of course be substituted for resistors 32. These resistors 32 are all connected in series between the terminals 24 and 25 of potentiometer 10 in the same way that coil 21 is connected between these terminals in Fig. 1. The embedded steel plates 30 function in the same manner as the embedded tip portions of the individual turns of coil 21, while resistors 32 correspond to the resistance wire comprising coil 21.

It will be appreciated that for greatest accuracy the conducting plates 30 should be spaced as closely as possible, and that the spacing of the plates has been greatly exaggerated in Fig. 3 for purposes of illustration.

It will thus be seen that I have provided a high-precision, smooth contact-surfaced potentiometer having a linear and continuous output voltage versus contact arm position characteristic throughout its range of movement. The resulting potentiometer is mechanically rugged, long-wearing, and produces minimized electrical noise in circuits in which it is connected.

Although I have described above particular embodiments of the invention, many modifications may be made. For example, the invention may be embodied in wire-wound potentiometers designed to deliver an output voltage proportional to a sine-wave or a tangent-wave in response to the linear movement of a contact member by merely interposing a plastic body between the wire coils thereof and the contact member as illustrated above in connection with the linear output potentiometer of Fig. 1. I intend, therefore, by the appended claims to cover all such modifications as fall within the true spirit and scope of the invention.

What I claim as new and desire to secure by Letters Patent of the United States is:

1. An adjustable impedance device comprising an electrically conducting plastic body, a movable contact member continuously engaging said body along a path of movable contact therewith, and a plurality of electrical conductors embedded within said conducting plastic in mutually closely spaced positions along and closely spaced from the contact path of said contact member, adjacent conductors being electrically connected together and the resistivity of the connections between adjacent conductors being considerably less than the resistivity of said plastic body between said adjacent conductors.

2. A precision potentiometer comprising a wire coil, an electrically conducting plastic body contacting and covering at least a portion of each adjacent turn of said coil in such a manner that all of the turns of said coil are contacted by said plastic body, and a movable contact member slidably contacting the surface of said conducting plastic during its movement over a contact path closely spaced from and extending across the turns of said coil.

3. A precision potentiometer comprising a closely wound wire coil, and an electrically conducting plastic body contacting and covering at least a portion of each adjacent turn of said coil whereby all of the turns of said coil are contacted by said covering, and a movable contact member, said movable contact member being movably positioned adjacent to said plastic body in such a manner that it makes substantially punctiform slidable contact with the surface of said conducting plastic during its movement over a contact path closely spaced from and extending across the turns of said coil.

4. A precision potentiometer comprising a wire coil, an electrically conducting plastic body contacting and covering at least a portion of each adjacent turn of said coil in such a manner that all of the turns of said coil are contacted by said covering, said conducting plastic having a resistance over the distance between each adjacent turn of the coil from five to twenty times greater than the adjacent turn resistance of the coil itself, and a movable contact member slidably contacting the surface of said conducting plastic during its movement over a contact path closely spaced from and extending across the turns of said coil.

5. A precision potentiometer comprising a wire coil, an electrically conducting plastic body contacting and covering at least a portion of each adjacent turn of said coil in such a manner that all of the turns of said coil are contacted by said covering, said conducting plastic body covering said coil with a substantially uniform thickness and having a resistance over the distance between each adjacent turn of said coil from five to twenty times greater than the adjacent turn resistance of the coil itself, and a movable contact member slidably contacting the surface of said conducting plastic body during its movement over a contact path closely spaced from and extending across the turns of said coil.

6. A precision potentiometer comprising a wire coil, an electrically conducting plastic body contacting and covering at least a portion of each adjacent turn of said coil in such a manner that all of the turns of said coil are contacted by said covering, said conducting plastic covering the coil with a non-uniform thickness and having a resistance over the distance between each adjacent turn of said coil from five to twenty times greater than the adjacent turn resistance of the coil itself, and a movable contact member slidably contacting the surface of said conducting plastic during its movement over a contact path closely spaced from and extending across the turns of said coil.

7. A precision potentiometer comprising a wire coil, an electrically conducting plastic body contacting and covering at least a portion of each adjacent turn of said coil in such a manner that all of the turns of said coil are contacted by said covering, and a movable contact member slidably contacting the surface of said conducting plastic during its movement over a contact path closely spaced from an extending across the turns of said coil, the thickness of said conducting plastic body between said coil and said contact member varying along the contact path of said contact member to compensate for inherent variations in the conductivity of said plastic body of said wire coil.

8. A precision potentiometer comprising a wire coil, an electrically conducting plastic body contacting and covering at least a portion of each adjacent turn of said coil in such a manner that all of the turns of said coil are contacted by said covering, and a movable contact member slidably contacting the surface of said conducting plastic during its movement over a contact path closely spaced from and extending across the turns of said coil, the thickness of the conducting plastic body between the coil and contact member being of the same order of magnitude as the diameter of the wire of the coil, and the resistance of the plastic body over the distance between adjacent turns of the coil being substantially greater than the adjacent turn resistance of the coil itself.

9. In a precision potentiometer, a wire coil, an electrically conducting plastic body comprising a resinous binder containing a filler of finely divided electrically conducting material, said plastic body covering at least a portion of adjacent turns of said coil, and a movable contact member slidably contacting the surface of said conducting plastic during its movement over a contact path closely spaced from and extending across the turns of said coil.

10. A resistance element comprising a closely wound wire coil, and an electrically conducting plastic body fused with and covering at least a portion of adjacent turns of said coil, said body covering said coil with substantially uniform thickness along its length and having a resistivity along a continuous path and between adjacent turns of the coil from five to twenty times greater than the adjacent turn resistance of the coil itself.

References Cited in the file of this patent
UNITED STATES PATENTS

| | | |
|---|---|---|
| 1,903,142 | Schellenger | Mar. 28, 1933 |
| 2,333,477 | Duston | Nov. 2, 1943 |
| 2,443,018 | Arvin | June 8, 1948 |
| 2,500,605 | De Lange et al. | Mar. 14, 1950 |